United States Patent
Lim et al.

(10) Patent No.: US 10,764,852 B2
(45) Date of Patent: Sep. 1, 2020

(54) METHOD AND APPARATUS FOR DEVICE-TO-DEVICE COMMUNICATION IN PARTIAL NETWORK ENVIRONMENT

(71) Applicant: Samsung Electronics Co., Ltd., Suwon-si, Gyeonggi-do (KR)

(72) Inventors: Chiwoo Lim, Suwon-si (KR); Hyunseok Ryu, Yongin-si (KR); Seunghoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/032,480

(22) PCT Filed: Nov. 10, 2014

(86) PCT No.: PCT/KR2014/010757
§ 371 (c)(1),
(2) Date: Apr. 27, 2016

(87) PCT Pub. No.: WO2015/072713
PCT Pub. Date: May 21, 2015

(65) Prior Publication Data
US 2016/0262124 A1   Sep. 8, 2016

(30) Foreign Application Priority Data
Nov. 15, 2013  (KR) .......................... 10-2013-0139173

(51) Int. Cl.
*H04W 56/00*  (2009.01)
*H04W 4/70*   (2018.01)
(Continued)

(52) U.S. Cl.
CPC ......... *H04W 56/0015* (2013.01); *H04J 11/00* (2013.01); *H04L 5/14* (2013.01);
(Continued)

(58) Field of Classification Search
CPC . H04W 56/0015; H04W 12/06; H04W 4/005; H04W 56/0025; H04W 88/06; H04W 72/04; H04L 5/14; H04J 11/00
See application file for complete search history.

(56) References Cited

U.S. PATENT DOCUMENTS 7,286,841 B2 * 10/2007 Sun ...................... H04B 7/2681
370/278
7,336,638 B2 *  2/2008 Cheng ................. H04W 52/383
370/278

(Continued)

FOREIGN PATENT DOCUMENTS

| KR | 10-2009-0100205 A | 9/2009 |
| WO | 2013/077684 A1 | 5/2013 |
| WO | 2013/081393 A1 | 6/2013 |

OTHER PUBLICATIONS

"HTC", Construction of D2D relay communication in public safety scenario, R1-133262, 3rd Generation Partnership Project (3GPP), Mobile Competence Centre, 650, Route Des Lucioles, F-06921 Sophia, vol. RAN WG1, No. 74, Barcelona, Spain, Aug. 19-23, 2013, XP050716419.

(Continued)

*Primary Examiner* — Ajit Patel
*Assistant Examiner* — Wilfred Thomas
(74) *Attorney, Agent, or Firm* — Jefferson IP Law, LLP

(57) ABSTRACT

According to an embodiment of this disclosure, a method for transmitting and receiving a signal in a device of a mobile communication system includes steps of receiving, from a base station, a first message containing one or more of synchronization information and resource allocation information; transmitting, to other device, a second message containing the received synchronization information and resource allocation information; and receiving, from the other device, a third message for a random access based on (Continued)

the synchronization information and the resource allocation information. According to an embodiment of the present disclosure, even a device failing to obtain synchronization can obtain synchronization from a base station through other device, receive authentication and security related information, and thereby perform reliable D2D communication. Also, a communication efficiency can be improved by transmitting and receiving D2D related information between devices through limited resources.

12 Claims, 7 Drawing Sheets

(51) Int. Cl.
  *H04J 11/00* (2006.01)
  *H04L 5/14* (2006.01)
  *H04W 12/06* (2009.01)
  *H04W 72/04* (2009.01)
  *H04W 88/06* (2009.01)

(52) U.S. Cl.
  CPC ............ *H04W 4/70* (2018.02); *H04W 12/06* (2013.01); *H04W 56/0025* (2013.01); *H04W 72/04* (2013.01); *H04W 88/06* (2013.01)

(56) References Cited

U.S. PATENT DOCUMENTS

| | | | |
|---|---|---|---|
| 8,189,508 B2 | 5/2012 | Park et al. | |
| 9,609,608 B2 | 3/2017 | Choi et al. | |
| 9,781,690 B2* | 10/2017 | Parkvall | H04W 56/002 |
| 2006/0245398 A1* | 11/2006 | Li | H04B 7/2668 |
| | | | 370/335 |
| 2011/0019694 A1 | 1/2011 | Kwon et al. | |
| 2012/0093098 A1* | 4/2012 | Charbit | H04W 72/04 |
| | | | 370/329 |
| 2012/0188897 A1 | 7/2012 | Shen | |
| 2013/0128792 A1 | 5/2013 | Liu et al. | |
| 2013/0148566 A1* | 6/2013 | Doppler | H04W 72/005 |
| | | | 370/312 |
| 2013/0157669 A1* | 6/2013 | Turtinen | H04W 48/12 |
| | | | 455/450 |
| 2013/0288698 A1 | 10/2013 | Rune et al. | |
| 2014/0286293 A1* | 9/2014 | Jang | H04L 5/0044 |
| | | | 370/329 |
| 2014/0321452 A1* | 10/2014 | Choi | H04W 8/005 |
| | | | 370/350 |
| 2015/0055616 A1* | 2/2015 | Kim | H04W 56/00 |
| | | | 370/330 |
| 2015/0057006 A1* | 2/2015 | Gao | H04W 56/0045 |
| | | | 455/450 |
| 2015/0156757 A1* | 6/2015 | Kalhan | H04L 1/1607 |
| | | | 370/330 |
| 2015/0181366 A1* | 6/2015 | Chae | H04W 72/048 |
| | | | 370/336 |

OTHER PUBLICATIONS

"ZTE", Discussion of D2D Discovery, R1-133149, 3rd Generation Partnership Project (3GPP), Mobile Competence Centre, 650, Route Des Lucioles, F-06921 Sophia-Antipolis, Cedex, France, vol. RAN WG1, No. 74, Barcelona, Spain, Aug. 19-23, 2013, XP050716361.
Korean Office Action dated Aug. 8, 2019, issued in Korean Patent Application No. 10-2013-0139173.

* cited by examiner

METHOD AND APPARATUS FOR DEVICE-TO-DEVICE COMMUNICATION IN PARTIAL NETWORK ENVIRONMENT

TECHNICAL FIELD

Embodiments of the present disclosure relate to a method and apparatus for communication of device. Specifically, embodiments relates to device-to-device (D2D) communication in a cellular system and, more particularly, to a method and apparatus for allowing a device located outside a cellular region to participate in a discovery process of devices located inside the cellular region in the D2D communication.

BACKGROUND ART

With kinds of services using a wireless mobile communication system being greatly diversifying, new technologies to effectively support such services have been required and thus many studies and developments therefor have been made in the wireless mobile communication system.

Device-to-device (D2D) communication is one of new technologies for the solution to new services. Basically, D2D communication allows a certain device to directly communicate with any other neighboring device. Using such D2D communication technology, the device can perform a discovery function to find neighboring devices and a direct communication function with such devices.

Compared with traditional communication using a base station in the existing wireless network, D2D direct communication has a great advantage in view of efficiency of radio resources because of using relatively fewer radio resources. Additionally, since a method for finding neighboring devices is supported, a device can directly provide necessary information to any desired device, thus enhancing efficiency in supporting an advertisement service, a social networking service (SNS), and the like. Currently, the long term evolution-advanced (LTE-A) system is also requiring a support for D2D technology and therefore brings about a technical discussion.

Recently, an active discussion about a D2D service in the cellular system is in progress, and a discovery between devices is an essential process in the D2D service. In this D2D communication, a method and apparatus for communicating with a device located outside a cellular region are required.

DISCLOSURE OF INVENTION

Technical Problem

Embodiments of the present disclosure propose a method and apparatus for allowing a device located outside a cellular region to participate in a discovery process of devices located inside the cellular region in the D2D communication

Solution to Problem

A method for transmitting and receiving a signal in a device of a mobile communication system according to an embodiment of the present disclosure includes steps of receiving, from a base station, a first message containing one or more of synchronization information and resource allocation information; transmitting, to other device, a second message containing the received synchronization information and resource allocation information; and receiving, from the other device, a third message for a random access based on the synchronization information and the resource allocation information.

A device for transmitting and receiving a signal in a mobile communication system according to another embodiment of the present disclosure includes a transceiver configured to transmit and receive a signal; and a control unit configured to receive, from a base station, a first message containing one or more of synchronization information and resource allocation information, to transmit, to other device, a second message containing the received synchronization information and resource allocation information, and to receive, from the other device, a third message for a random access based on the synchronization information and the resource allocation information.

A base station for transmitting and receiving a signal in a mobile communication system according to another embodiment of the present disclosure includes a transceiver configured to transmit and receive a signal; and a control unit configured to create a first message containing one or more of synchronization information and resource allocation information for a random access of a device, and to transmit the created message to a first device, wherein a second message created based on information contained in the first message is transmitted to a second device by the first device, and wherein a third message for a random access based on the synchronization information and the resource allocation information is transmitted to the first device from the second device.

A device for transmitting and receiving a signal in a mobile communication system according to another embodiment of the present disclosure includes a transceiver configured to transmit and receive a signal; and a control unit configured to receive, from other device, a first message containing synchronization information and resource allocation information for a random access, and to transmit, to the other device, a second message for a random access based on the synchronization information and the resource allocation information.

Advantageous Effects of Invention

According to an embodiment of the present disclosure, even a device failing to obtain synchronization can obtain synchronization from a base station through other device, receive authentication and security related information, and thereby perform reliable D2D communication. Also, a communication efficiency can be improved by transmitting and receiving D2D related information between devices through limited resources.

MODE FOR THE INVENTION

Figure 1:
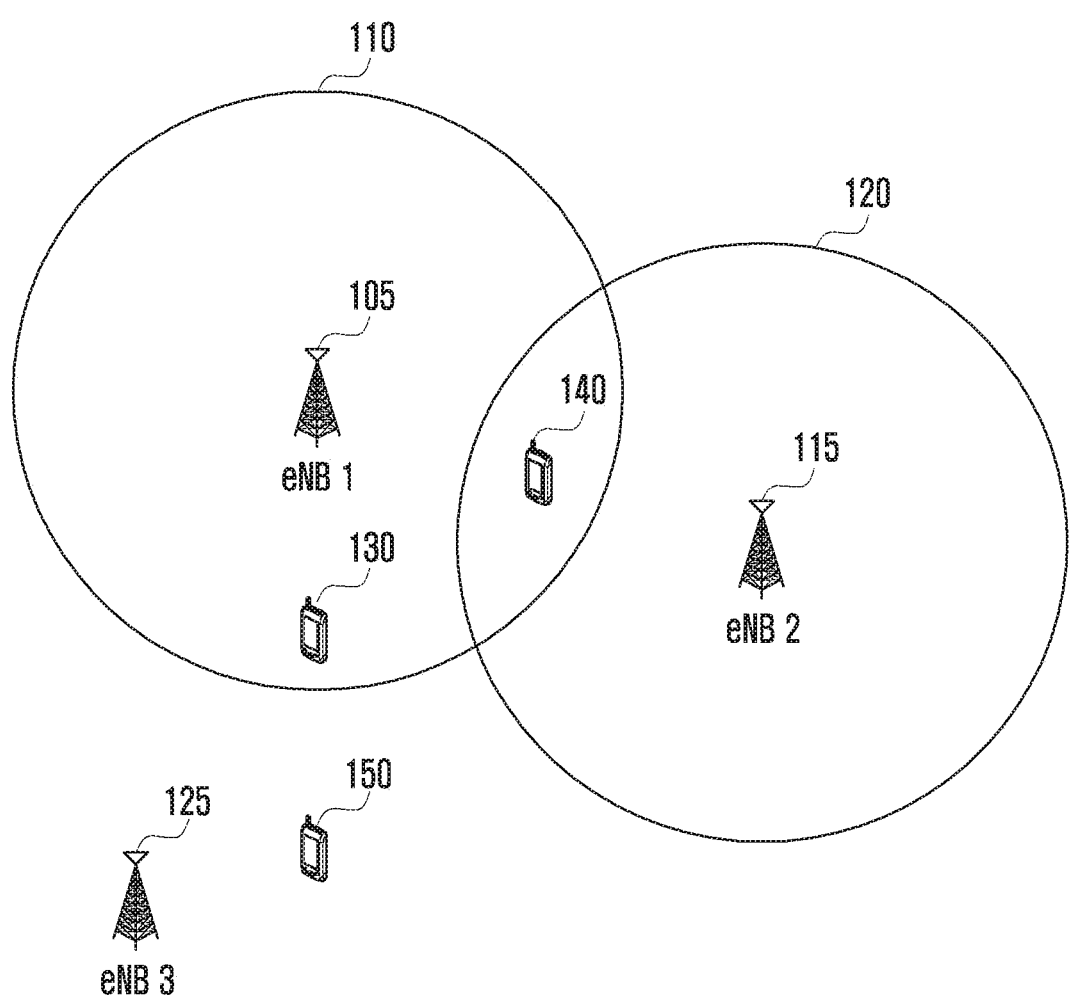
FIG. 1 is a diagram illustrating a communication environment according to an embodiment of the present disclosure.

Hereinafter, embodiments of the present invention will be described with reference to the accompanying drawings.

In this disclosure, some techniques or elements, which are well known in the art or irrelevant to disclosed embodiments, may not be described or illustrated in detail. This is to avoid obscuring the subject matter of the present disclosure.

For similar reasons, the drawings are not necessarily to scale and certain features may be exaggerated or omitted in order to better illustrate and explain the present disclosure. Through the drawings, the same or similar reference numerals denote corresponding features consistently.

Hereinafter, the present invention will be described in detail according to various embodiments.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

Hereinafter, the present invention will be fully described with reference to the drawings for illustrating [Invention Title] by using embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

A mobile device according to an embodiment of the present disclosure may include a portable electronic device such as a mobile phone, a PDA (Personal Digital Assistant), a navigation, a digital broadcasting receiver, a PMP (Portable Multimedia Player), and the like.

In an embodiment of the present disclosure, disclosed are a method and apparatus for allowing a device located outside a cell coverage to perform RACH through a procedure of a device located inside the cell coverage to transmit and obtain a synchronization signal having resources for RACH and RAR on UL, for allowing such an intra-cell device to transmit RAR (TA information transmission and resource allocation for message transmission), and for allowing such an extra-cell device to transmit L2/L3 information, to perform authentication and authorization with a base station, and to participate in a discovery process between intra-cell devices.

Additionally, in an embodiment of the present disclosure, disclosed are a method and apparatus for allowing a device located outside a cell coverage to participate in a discovery process for D2D communication with an intra-cell device in an environment of synchronization between cells, and for allowing an authentication procedure in the discovery process.

In an embodiment of the present disclosure, disclosed are operations associated with a discovery participation process for a partial network coverage device being outside a cell of cellular communication in a discovery process during D2D communication, and a method for the partial network coverage device to perform one or more of the acquisition of synchronization and authentication when participating in a D2D discovery. Specifically, provided are a method and apparatus for solving a synchronization acquisition issue (transmission issue of a synchronization signal), bi-directional discovery issue (TA needed), and authentication and authorization issue, which can be caused when the partial network coverage device performs D2D communication.

Hereinafter, embodiments of the present disclosure will be described with reference to the accompanying drawings. In this disclosure, well known functions or structures may not be described or illustrated in detail to avoid obscuring the subject matter of the present invention. Additionally, the terms used herein are defined in view of functions in this invention and may be varied according to user or operator's intention or custom. Therefore, such a definition should be made on the basis of the contents of this disclosure.

FIG. 1 is a diagram illustrating a communication environment according to an embodiment of the present disclosure.

Referring to FIG. 1, the first base station (hereinafter, evolved NodeB (eNB)) 105, the second eNB 115 and the third eNB 125 may perform communication with devices. Additionally, in an embodiment, the first eNB 105 may form the first cell 110, and the second eNB 115 may form the second cell 120, while transmitting or receiving a signal to or from devices (hereinafter, user equipment (UE)) 130 and 140 within each cell. In an embodiment, each eNB may transmit or receive a signal, especially, at least one of a control signal and a data signal, to or from each UE. Through such signal transmission and reception, each UE may obtain synchronization and be allocated resources for transmitting and receiving a signal. In addition, each UE may perform an authentication procedure for performing communication.

Also, each UE 130 and 140 may perform D2D communication. Specifically, each UE 130 and 140 may obtain synchronization through transmission and reception of a signal to and from the eNBs 105 and 115, may perform D2D communication based on the obtained synchronization, and may perform a procedure such as authentication.

In an embodiment, UE 150 is in an environment incapable of communication with a network formed by the eNBs. This environment may include case in which the third eNB 125 is placed in a situation of incapable of performing communication, or case in which the UE 150 is located outside the coverage of cell formed by the eNB.

In an embodiment, the UE 150 may fail to transmit and receive a signal to and from a network formed by the eNB and thus may fail to obtain synchronization and to perform an authentication procedure. Additionally, the UE 150 may fail to obtain timing advance (TA) information for signal transmission in the D2D communication. As discussed hereinbefore, in a partial network coverage circumstance in which certain UE is located outside the cell coverage of the eNB, a method and apparatus for performing the D2D communication are required. Further, the invention disclosed herein may be used even in any case other than the partial network coverage circumstance. Specifically, a method of this invention may be used for the D2D communication even between UEs located in the coverage of the eNB.

Figure 2:
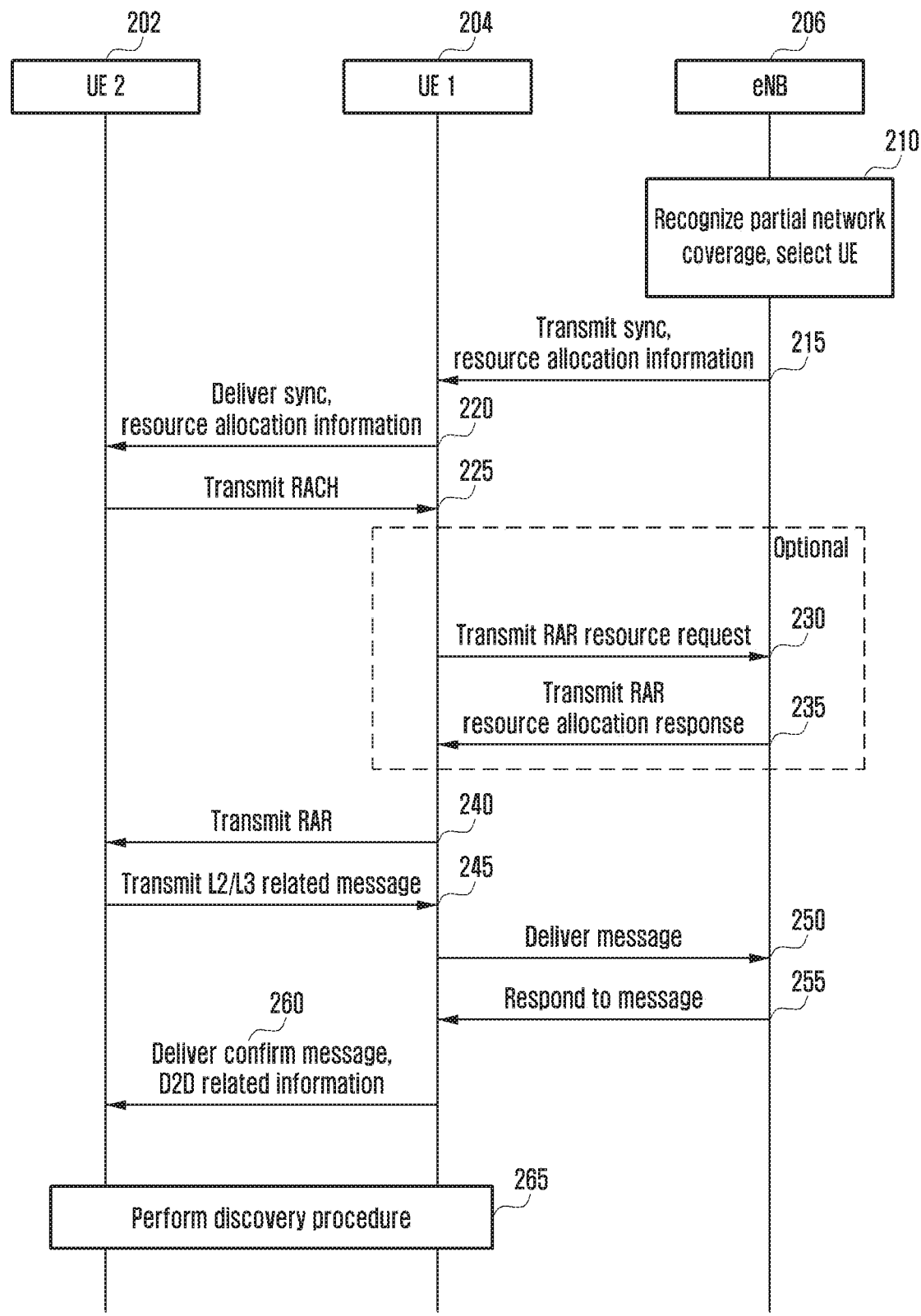
FIG. 2 is a flow diagram of signals for performing device-to-device communication according to an embodiment of the present disclosure.

FIG. 2 is a flow diagram of signals for performing device-to-device communication according to an embodiment of the present disclosure.

Referring to FIG. 2, the first UE 204 is placed in an environment capable of transmitting and receiving a signal to and from eNB 206, and the second UE 202 can transmit and receive a signal to and from the first UE 204. Also, depending on embodiments, any case in which the second UE 202 is located outside the coverage formed by the eNB 206 or other eNB may be considered.

At step 210, the eNB 206 may recognize circumstances of the second UE 202. Although an embodiment assumes a partial network coverage circumstance, any circumstance requiring that the eNB 206 should deliver a signal having synchronization information to the second UE 202 through the first UE 204 may be included. In an embodiment, step 210 may be performed by the eNB 206 that determines the inoperativeness of other eNB through a network connected thereto. In another embodiment, the eNB 206 may recognize the partial network coverage circumstance through a report of the first UE 204. The first UE 204 may report, to the eNB 206, on circumstances in which the second UE 202 is located outside the coverage or incapable of receiving a service of eNB. Additionally, information of step 210 may be received through any upper information or a help signal received from the first UE 204.

At step 215, the eNB 206 may select UE to which information associated with D2D communication will be delivered, and then may deliver a signal having one or more of synchronization information and resource allocation information to the first UE 204. In an embodiment, the eNB 206 may select the first UE 204 and deliver the above signal. Depending on embodiments, the eNB 206 may select the first UE 204, based on the location of the second UE 202. Depending on embodiments, the delivered signal may contain information associated with a resource for transmitting a synchronization signal. Additionally, the delivered signal may selectively contain information associated with a resource for transmitting RAR (Random Access Response).

At step 220, the first UE 204 may transmit one or more of a synchronization signal and related information to the second UE 202, based on information received at step 215. Such related information may include RACH (Random Access CHannel) related information for the second UE 202 to perform a random access. The RACH related information may include one or more of a location of RACH on the time domain and a preamble format. In an embodiment, a frequency location of RACH may be identical with a location of a synchronization signal or set to be transmitted to a specific region according to predefined information.

Additionally, the related information may selectively include information for RAR. Specifically, in case of receiving, from the eNB 206, information associated with a resource for RAR transmission at step 215, the first UE 204 may deliver the information associated with a resource for RAR transmission to the second UE 202.

In an embodiment, the first UE 204 may include one or more of a device reporting the status of the second UE 202 to eNB and a device delivering a signal of eNB to the second UE 202. Respective operations may be performed through the same device or different devices.

At step 225, the second UE 202 may perform a random access through RACH based on the information received at step 220. Specifically, the second UE 202 may perform a random access based on the RACH resource information received at step 220. More specifically, the second UE 202 may transmit a message containing a preamble for a random access to the first UE 204. At this time, the preamble may be selected preambles for a random access to the eNB 206 or use any other preamble.

At step 230, the first UE 204 may transmit a message for requesting a resource for sending RAR (Random Access Response) for the random access to the eNB 206 based on the information received at step 225.

At step 235, the eNB 206 may transmit a message containing RAR resource allocation information based on the message received at step 230.

In an embodiment, operations of steps 230 and 235 may be selectively performed depending on the information received at step 215. Specifically, if the first UE 204 receives an RAR related resource from the eNB at step 215, steps 230 and 235 may be not performed and the information received at such steps may be received through step 215 by the first UE 204. In this case, the information transmitted at step 215 may be transmitted through the same signal or different signals. The signal transmitted at step 235 may include at least one of resource allocation information for transmission of an authentication related message, resource allocation information for transmission of an L2/L3 message, and TA (Timing Advance) information determined based on the message received at step 225.

At step 240, the first UE 204 may transmit a response to the random access through a resource for allocated RAR to the second UE 202. Also, together with the above message, at least one of resource allocation information for allowing the second UE 202 to transmit an authentication related message, resource allocation information for transmission of an L2/L3 message, and TA information determined based on the message received at step 225 may be transmitted.

At step 245, the second UE 202 may transmit the L2/L3 message based on the information received at step 240. Also, the above message may contain authentication and authorization information. And also, the above message may be transmitted to the first UE 204 through uplink subframe at a timing determined based on a TA value received at step 240.

At step 250, the first UE 204 may deliver, to the eNB 206, the message received at step 245.

At step 255, the eNB 206 may deliver additional resource allocation related information based on the message received at step 250. In an embodiment, the additional resource allocation information may include one or more of information about subframe for D2D discovery and information about a discovery signal resource block.

At step 260, the first UE 204 may transmit a confirm message to the second UE 202 based on the message received at step 255. The confirm message may contain information associated with D2D to be performed.

At step 265, the second UE 202 may perform a discovery procedure based on the message received at step 260 and perform D2D communication with neighboring devices.

Figure 3:
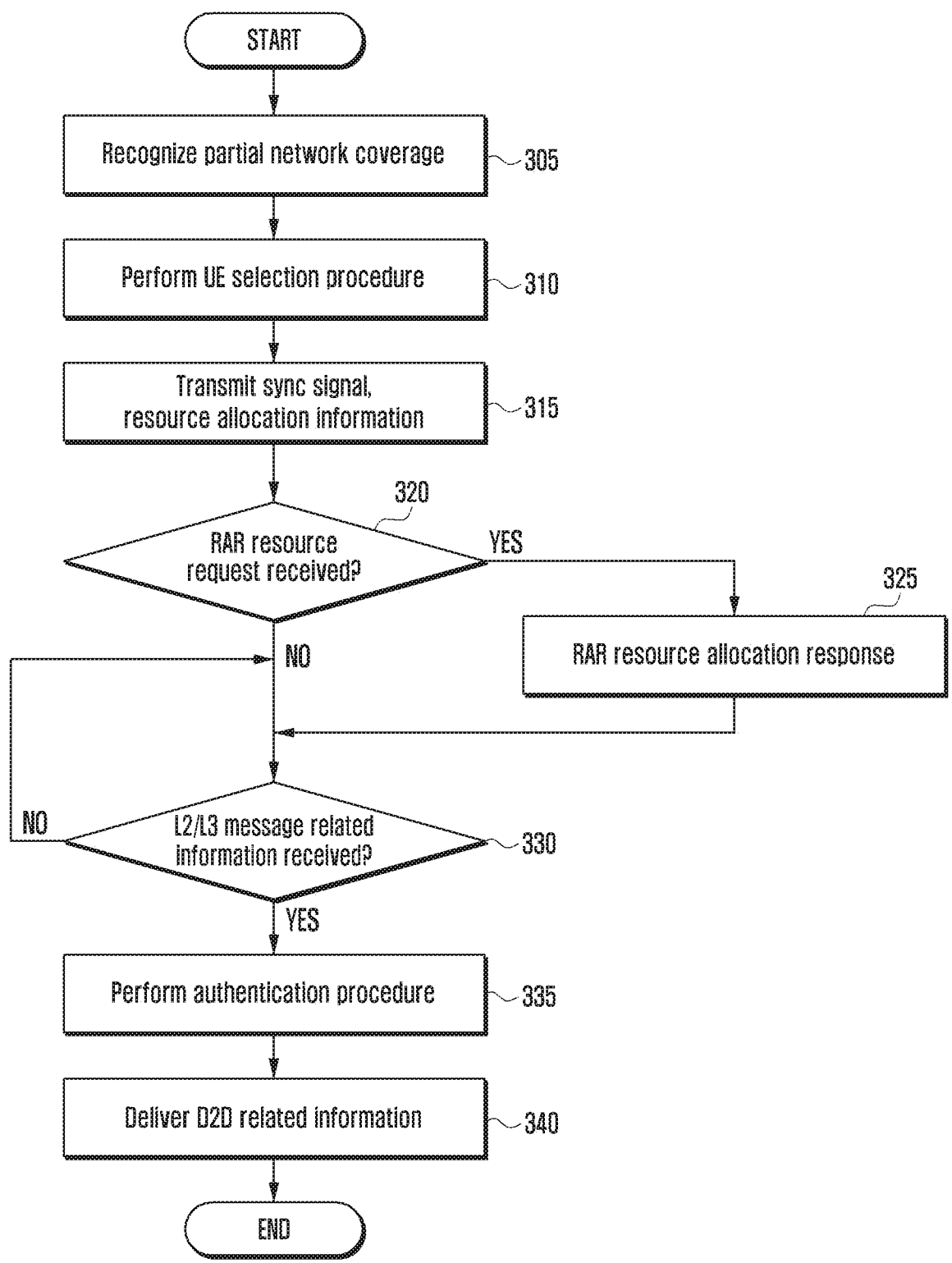
FIG. 3 is a flow diagram illustrating operations of eNB according to an embodiment of the present disclosure.

FIG. 3 is a flow diagram illustrating operations of eNB according to an embodiment of the present disclosure.

Referring to FIG. 3, the eNB may recognize a circumstance in which some UE is in partial network coverage. Although an embodiment assumes a partial network coverage circumstance, any circumstance requiring that the eNB should deliver a signal including a synchronization signal to some UE through UE inside the coverage may be included. In an embodiment, step 305 may be performed by the eNB that determines the inoperativeness of some eNB through a network connected thereto. In another embodiment, the eNB may recognize the partial network coverage circumstance through a report of the UE inside the coverage. The UE located outside the coverage may report, to the eNB through the UE located inside the coverage, on circumstances in which it is located outside the coverage or incapable of receiving a service of eNB. Additionally, step 305 may be determined through any upper information or a help signal received from UE.

At step 310, the eNB may perform a procedure for selecting UE to which a signal containing synchronization related information will be transmitted. The selection procedure may be performed based on one or more of a location of UE located inside the coverage, a location of UE located outside the coverage, a location of eNB, and signal transmission/reception strength.

At step 315, the eNB may deliver a signal containing one or more of D2D synchronization information and resource allocation information to the selected UE. Depending on embodiments, the delivered signal may contain information associated with a resource for transmitting a synchronization signal. Additionally, the delivered signal may selectively contain information associated with a resource for transmitting RAR (Random Access Response).

At step 320, the eNB determine whether a request for a resource for RAR is received from the UE. In an embodiment, if information associated with a resource for RAR transmission is transmitted at step 315, the RAR resource request may be not received from the UE. In an embodiment, if any resource request associated with RAR is received, the eNB may transmit information associated with a resource for sending RAR at step 315. Also, in an embodiment, together with the above information, at least one of resource allocation information for transmission of an authentication related message, resource allocation information for transmission of an L2/L3 message, and TA information may be transmitted. The TA information may be used for determining an uplink transmission timing of UE located outside the eNB coverage.

At step 330, the eNB may determine whether L2/L3 message related information is received. If not received, the eNB may wait until the related information is received. If the L2/L3 message related information is received, the eNB may perform an authentication procedure based on the received information at step 335.

At step 340, the eNB may deliver D2D related information to the UE. In an embodiment, the D2D related information may include one or more of information about subframe for D2D discovery and information about a discovery signal resource block. In an embodiment, the UE that receives the above information may deliver the received information to other UE. Based on this, UE located outside the eNB may participate in D2D communication together with other UE.

Figure 4:
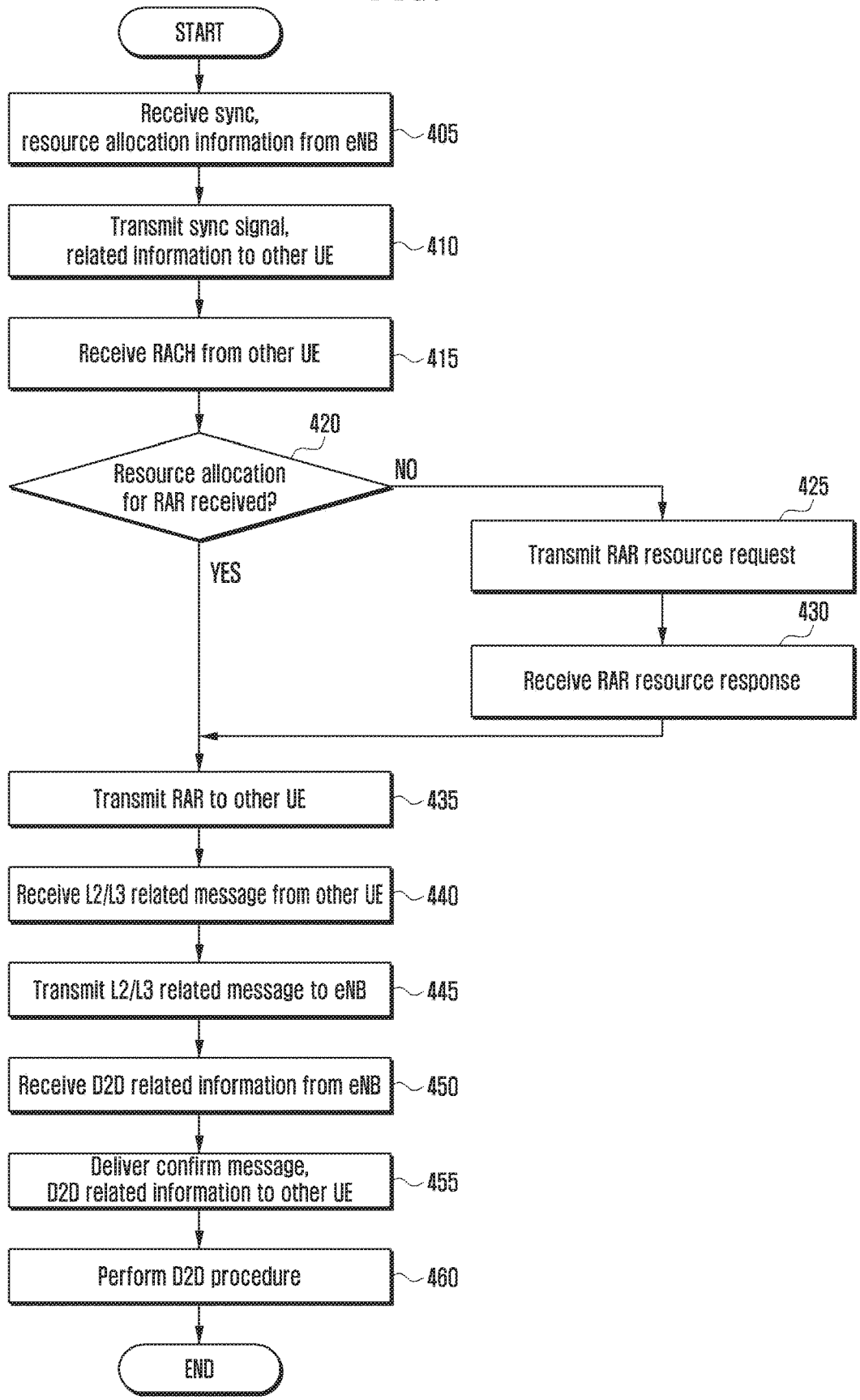
FIG. 4 is a flow diagram illustrating operations of UE for transmitting and receiving a signal to and from eNB and other UE according to an embodiment of the present disclosure.

FIG. 4 is a flow diagram illustrating operations of UE for transmitting and receiving a signal to and from eNB and other UE according to an embodiment of the present disclosure.

Referring to FIG. 4, the UE may receive a signal containing one or more of synchronization information and resource allocation information from eNB. Depending on embodiments, the delivered signal may contain information associated with a resource for transmitting a synchronization signal. Also, the delivered signal may selectively contain information associated with a resource for transmitting RAR (Random Access Response).

At step 410, the UE may deliver related information to other UE, based on the information received at step 405. In an embodiment, the UE may transmit one or more a synchronization signal and related information to the other UE. In an embodiment, the related information may include RACH (Random Access CHannel) related information for the other UE to perform a random access. The RACH related information may include one or more of a location of RACH on the time domain and a preamble format. In an embodiment, a frequency location of RACH may be identical with a location of a synchronization signal or set to be transmitted to a specific region according to predefined information. Also, the related information may selectively include information for RAR.

At step 415, the UE may receive a random access from the other UE. The random access may be performed based on the information transmitted at step 410. At step 420, the UE may determine whether RAR related information is received at step 405. If it is determined at step 420 that the RAR related information is not received, the UE may transmit an RAR resource request to the eNB at step 425 and receive an RAR response at step 430. The information received at step 430 may include at least one of resource allocation information for transmission of an authentication related message, resource allocation information for transmission of an L2/L3 message, and TA (Timing Advance) information determined based on the message received at step 225.

At step 435, the UE may transmit a response to the random access through a resource for allocated RAR to the other UE. Also, at step 435, the UE may determine the other UE based on the information received at step 430 or 405.

At step 440, the UE may receive an L2/L3 message from the other UE. The above message may contain authentication and authorization information. Also, the message received at step 440 may be transmitted from the other UE based on a TA value transmitted at step 435.

At step 445, the UE may transmit, to the eNB, the information received at step 440.

At step 450, the UE may receive D2D related information from the eNB. In an embodiment, the D2D related information may include one or more of information about subframe for D2D discovery and information about a discovery signal resource block.

At step 455, the UE may transmit at least one of a confirm message and D2D related information to the other UE. The confirm message may contain information associated with D2D to be performed.

At step 460, the UE may perform a D2D procedure with the other UE.

Figure 5:
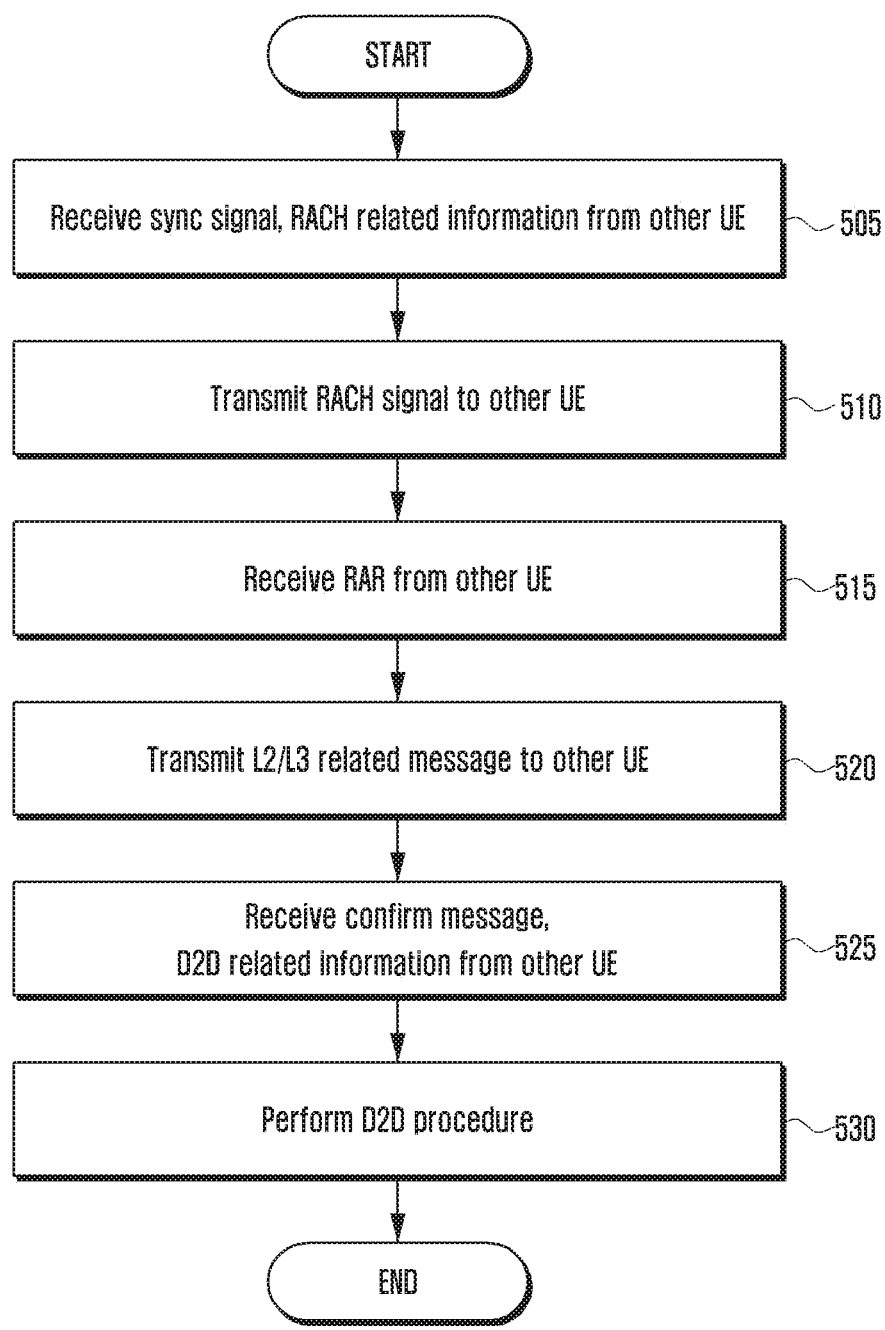
FIG. 5 is a flow diagram illustrating operations of UE for transmitting and receiving a signal to and from other UE according to an embodiment of the present disclosure.

FIG. 5 is a flow diagram illustrating operations of UE for transmitting and receiving a signal to and from other UE according to an embodiment of the present disclosure.

Referring to FIG. 5, the UE may receive a signal containing one or more of synchronization information and resource allocation information from the other UE. Depending on embodiments, the delivered signal may contain information associated with a resource for transmitting a synchronization signal. Also, the delivered signal may selectively contain information associated with a resource for transmitting RAR (Random Access Response). And also, the signal may include RACH (Random Access CHannel) related information for the UE to perform a random access. The RACH related information may include one or more of a location of RACH on the time domain and a preamble format. In an embodiment, a frequency location of RACH may be identical with a location of a synchronization signal or set to be transmitted to a specific region according to predefined information. Also, the related information may selectively include information for RAR.

At step 510, the UE may perform a random access to the other UE through RACH based on the information received at step 505.

At step 515, the UE may receive RAR from the other UE. In an embodiment, the RAR may contain at least one of resource allocation information for transmission of an authentication related message, resource allocation information for transmission of an L2/L3 message, and TA (Timing Advance) information.

At step 520, the UE may transmit an L2/L3 message to the other UE, based on the information received at step 515. The above message may contain authentication and authorization information.

At step 525, the UE may receive at least one of a confirm message and D2D related information from the other UE. The D2D related information may include one or more of information about subframe for D2D discovery and information about a discovery signal resource block.

At step 530, the UE may perform D2D communication with the other UE, based on the information received at step 525.

Figure 6:
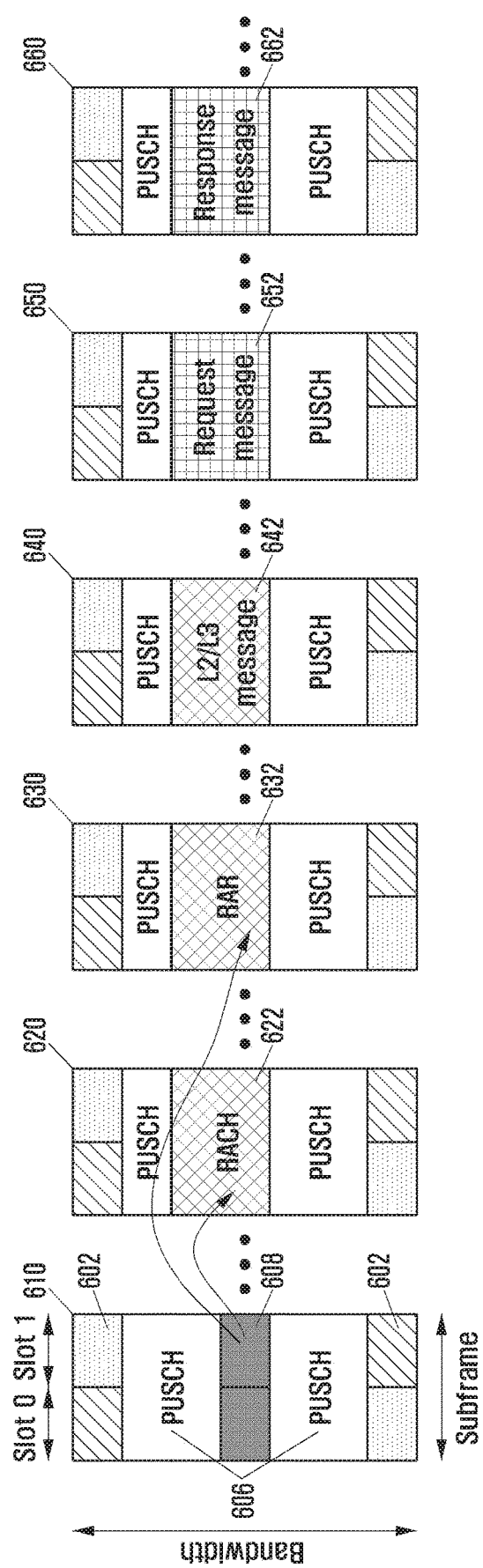
FIG. 6 is a diagram illustrating a structure of a resource for performing device-to-device communication according to an embodiment of the present disclosure.

FIG. 6 is a diagram illustrating a structure of a resource for performing device-to-device communication according to an embodiment of the present disclosure.

Referring to FIGS. 2 and 6, in an embodiment, data transmitted and received between UEs may be transmitted through an uplink transmission channel, and a subframe 610 of the uplink transmission channel may include a control channel 602 and a data channel 606. In an embodiment, the data channel 606 may include a resource region 608 having information transmitted or received in this invention.

Additionally, in an embodiment, a subframe 620 for transmission of a resource region 622 having RACH related information may be used. In this embodiment, the subframe 620 may correspond to a signal transmitted at step 225.

Additionally, in an embodiment, a subframe 630 for transmission of a resource region 632 having RAR related information may be used. In this embodiment, the subframe 630 may correspond to a signal transmitted at step 240.

Additionally, in an embodiment, a subframe 640 for transmission of a resource region 642 having L2/L3 related information may be used. In this embodiment, the subframe 640 may correspond to a signal transmitted at step 245.

Additionally, in an embodiment, a subframe 650 for transmission of a resource region 652 having request message related information may be used. In this embodiment, the subframe 650 may correspond to a signal transmitted at step 230 or 250.

Additionally, in an embodiment, a subframe 660 for transmission of a resource region 662 having response message related information may be used. In this embodiment, the subframe 660 may correspond to a signal transmitted at step 260.

In an embodiment, respective kinds of information may be transmitted through the same subframe or different subframes.

Figure 7:
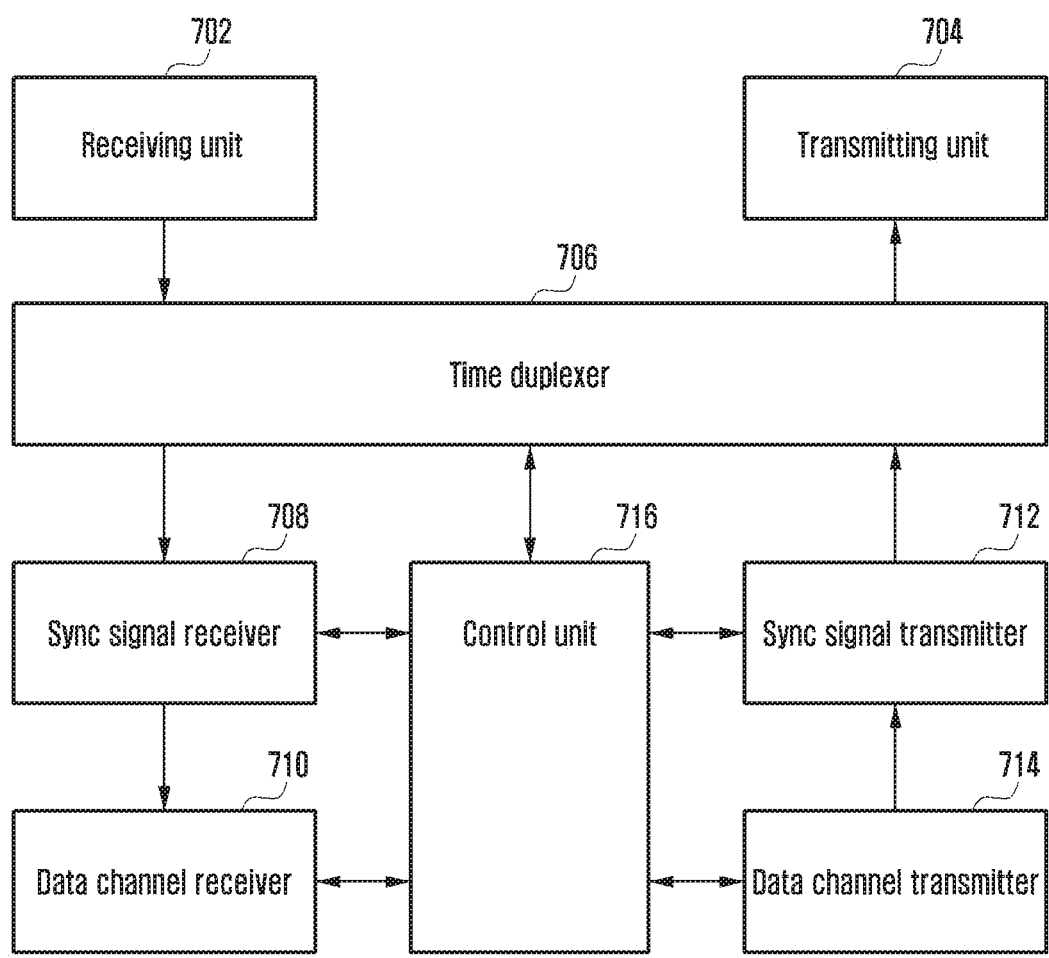
FIG. 7 is a diagram illustrating a configuration of a device according to an embodiment of the present disclosure.

FIG. 7 is a diagram illustrating a configuration of a device according to an embodiment of the present disclosure.

Referring to FIG. 7, a device controller 709 controls a receiving unit 701 and a transmitting unit 703 by using a time duplexer 705 to receive a synchronization signal through a sync signal receiver 708 and to transmit the received synchronization signal through a sync signal transmitter 713. Thereafter, data is received through a data channel receiver 711 based on a data channel transmitted after the synchronization signal, and this is retransmitted using a data channel transmitter 715. Also, a control of the above operations may be performed through a controller (control unit) 709. Specifically, the transmitting unit 704 and the receiving unit 702 may transmit and receive a signal to and from other UE or eNB. A control unit 716 may receive information from eNB or other UE and, based on this, create information. In an embodiment, the receiving unit 702 may receive one or more of synchronization information and resource allocation information from eNB. Additionally, the transmitting unit 704 may transmit the information created by the control unit 716 to other UE or eNB.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

While this invention has been particularly shown and described with reference to an exemplary embodiment thereof, it will be understood by those skilled in the art that various changes in form and details may be made therein without departing from the spirit and scope of this invention as defined by the appended claims.

What is claimed is:

1. A method for communication of a first device of a mobile communication system, the method comprising:
   receiving, from a base station, a first message including synchronization information and resource allocation information for a random access and a random access response;
   transmitting, to a second device, a synchronization signal and a second message based on the first message, the second message including random access channel (RACH) resource allocation information for the random access, the RACH resource allocation information based on the resource allocation information for the random access;
   receiving, from the second device, a third message for the random access based on the RACH resource allocation information; and
   transmitting, to the second device, a fourth message for the random access response based on the resource allocation information for the random access response included in the first message, the fourth message including information on a timing advance (TA) determined based on the third message,
   wherein a synchronization for receiving signal of the second device is based on the synchronization signal, and a synchronization for transmitting signal of the second device is based on the information on the TA.

2. The method of claim 1, further comprising:
   receiving, from the second device, a fifth message including authentication related information generated based on the fourth message.

3. The method of claim 1, further comprising:
   receiving, from the base station, resource allocation information for device-to-device signal transmission and reception; and
   transmitting, to the second device, the received resource allocation information for device-to-device signal transmission and reception.

4. A first device for communication in a mobile communication system, the first device comprising:
   a transceiver configured to transmit and receive a signal; and
   at least one processor coupled with the transceiver and configured to:
      receive, from a base station, a first message including synchronization information and resource allocation information for a random access and a random access response,
      transmit, to a second device, a synchronization signal and a second message based on the first message, the second message including random access channel (RACH) resource allocation information for the random access, the RACH resource allocation information based on the resource allocation information for the random access,
      receive, from the second device, a third message for the random access based on the RACH resource allocation information, and
      transmit, to the second device, a fourth message for the random access response based on the resource allocation information for the random access response included in the first message, the fourth message including information on a timing advance (TA) determined based on the third message,
   wherein a synchronization for receiving signal of the second device is based on the synchronization signal, and a synchronization for transmitting signal of the second device is based on the information on the TA.

5. The first device of claim 4, wherein the at least one processor is further configured to receive, from the second device, a fifth message including authentication related information generated based on the fourth message.

6. The first device of claim 4, wherein the at least one processor is further configured to receive, from the base station, resource allocation information for device-to-device signal transmission and reception, and to transmit, to the second device, the received resource allocation information for device-to-device signal transmission and reception.

7. A second device for communication in a mobile communication system, the first second device comprising:
   a transceiver configured to transmit and receive a signal; and
   at least one processor coupled with the transceiver and configured to:
      receive, from a first device, a synchronization signal and a first message, wherein the synchronization signal is based on synchronization information received from a base station and the first message includes random access channel (RACH) resource allocation information for performing a random access, wherein the RACH resource allocation information is based on first resource allocation information for the random access, received from the base station,
      transmit, to the first device, a second message for the random access based on the RACH resource allocation information, and
      receive, from the first device, a third message for a random access response transmitted based on second resource allocation information which is for the random access response and received from the base station, the third message including information on a timing advance (TA) determined based on the second message,
   wherein a synchronization for receiving signal of the second device is based on the synchronization signal, and a synchronization for transmitting signal of the second device is based on the information on the TA.

8. The second device of claim 7, wherein the at least one processor is further configured to transmit, to the second first device, a fourth message including authentication related information generated based on the third message.

9. The second device of claim 7, wherein the at least one processor is further configured to receive, from the first device, resource allocation information for device-to-device signal transmission and reception, the resource allocation information being received from the base station to the first device.

10. A method for communication of a second device in a mobile communication system, the method comprising:
    receiving, from a first device, a synchronization signal and a first message, wherein the synchronization signal is based on synchronization information received from a base station and the first message includes random access channel (RACH) resource allocation information for performing a random access, wherein the
RACH resource allocation information is based on first
resource allocation information for the random access,
received from the base station;

transmitting, to the first device, a second message for the
random access based on the RACH resource allocation
information; and receiving, from the first device, a third message for a
random access response transmitted based on second
resource allocation information which is for the random
access response and received from the base station, the
third message including information on a timing
advance (TA) determined based on the second message, wherein a synchronization for receiving signal of the
second device is based on the synchronization signal,
and a synchronization for transmitting signal of the
second device is based on the information on the TA.

11. The method of claim 10, further comprising:
transmitting, to the first device, a fourth message including authentication related information generated based on the third message.

12. The method of claim 10, further comprising:
receiving, from the first device, resource allocation information for device-to-device signal transmission and reception, the resource allocation information being received from the base station to the first device.

* * * * *